United States Patent [19]
Simmons

[11] Patent Number: 5,706,635
[45] Date of Patent: *Jan. 13, 1998

[54] PACKAGING MACHINE

[75] Inventor: Robert Julian Simmons, Llanyravon, England

[73] Assignee: Burton's Gold Medal Biscuits Limited, London, England

[*] Notice: The term of this patent shall not extend beyond the expiration date of Pat. No. 5,435,115.

[21] Appl. No.: 584,091

[22] Filed: Jan. 11, 1996

[30] Foreign Application Priority Data

Jan. 13, 1995 [GB] United Kingdom .................. 9500652

[51] Int. Cl.$^6$ ........................................... B65B 31/00
[52] U.S. Cl. ....................... 53/511; 53/550; 53/374.4
[58] Field of Search ..................... 53/511, 550, 551, 53/552, 433, 370.2, 370.5, 370.6, 371.7, 372.2, 374.4

[56] References Cited

U.S. PATENT DOCUMENTS

| | | | |
|---|---|---|---|
| 4,170,863 | 10/1979 | Schwarz | 53/511 |
| 4,715,166 | 12/1987 | Kameda | 53/550 |
| 5,014,496 | 5/1991 | Davis et al. | 53/511 |
| 5,052,166 | 10/1991 | Ziegler et al. | 53/511 |
| 5,109,654 | 5/1992 | Suga | 53/511 |
| 5,177,935 | 1/1993 | Jones et al. | 53/511 |
| 5,311,726 | 5/1994 | Rauscher et al. | 53/511 |
| 5,435,115 | 7/1995 | Simmons | 53/511 |
| 5,447,012 | 9/1995 | Kovacs et al. | 53/370.6 |
| 5,473,867 | 12/1995 | Suga | 53/511 |

*Primary Examiner*—Lowell A. Larson
*Assistant Examiner*—Ed Tolan
*Attorney, Agent, or Firm*—Rankin, Hill, Lewis & Clark

[57] ABSTRACT

A packaging machine (1) is adapted to form a web (8) of packaging material into a tube to surround items (3) to be packed, the tube then being closed, sealed and severed between successive items to produce individual packages (5). The tube is formed by sealing one surface of an edge zone of the web to the same surface of the opposite edge zone of the web so that, in the finished package, the sealed zones form a flap (45) extending longitudinally of the package. The machine comprises a support surface (2) having a longitudinal slot (43) therein, the slot being adapted to accommodate the flap, the machine further comprising at least two pairs of rollers (18,22), at least the first (18) of the pairs of rollers being located beneath the support surface (2), the pairs of rollers forming successive nips for gripping the flap (45) and driving the partly formed packages along the support surface (2) towards a closing, sealing and severing station (23) and for forming the required seal between the edge zones of the web (8), and means (32,34) for applying a vacuum to the tube adjacent the point where the edge zones of the web are brought together to form the tube, wherein the width of the longitudinal slot (43) for at least a section of the slot downstream of the point of application of the vacuum, is sufficiently great relative to the distance of at least the first pair of rollers (18) below the support surface (2) to allow an air passage to be formed within the tube as it moves towards the closing, sealing and severing station (23).

8 Claims, 3 Drawing Sheets

PACKAGING MACHINE

This invention relates to a packaging machine, and more particularly to a packaging machine of the type in which a web of packaging material is formed into a tube to surround the items to be packed and the tube is then sealed and severed between successive items to produce individual packages. The invention is more particularly concerned with packaging machinery of this type in which the tube is formed by sealing one surface of an edge zone of the web to the same surface of the opposite edge zone of the web so that, in the finished package, the sealed zones form a flap extending longitudinally of the package.

Packaging machines of the type described above are commonly used in the food manufacturing industry, more particularly for the packaging of biscuits and similar items. For the purposes of illustration the invention will be described in the context of a biscuits packaging machine. It should be appreciated, however, that the invention is of more general applicability and may be used in a wide range of packaging machines of the type described above.

In the packaging of biscuits by such machines the biscuits may already be held in containers of card or plastics material, for example, or they may be loose and simply assembled together into groups, each group being intended to be packaged to form a single packet of biscuits. In the latter case, the packaging machine bed is horizontal and the biscuits are arranged vertically—i.e. the biscuits stand on edge—as they are fed into the packaging machine by means of a conveyor. The groups of biscuits are automatically spaced apart by a distance sufficient to enable the packaging tube, between consecutive groups of biscuits, to be sealed and severed to form the individual packets required.

In machines of the prior art, the apparatus for sealing and severing the tube to form individual packets is typically located several packet lengths downstream of the tube forming station. This arrangement leads to two recognized disadvantages. Firstly, between the tube forming station and the tube severing station the biscuits must be supported and maintained in their pre-formed groups. In particular, because the biscuits are standing on edge, care must be taken to prevent the leading or trailing biscuit in each group from falling over. Because, along the relevant portion of the machine length, the biscuits are totally enclosed by the tube it is not possible to support the biscuits directly by means of fingers extending from the conveyor. In the circumstances, conventional practice has been to provide a pair of chains, one each side of the line of the tube, to engage the lateral faces of the tube and maintain the biscuits in the correct position. Each time the packaging line is changed for a different type of biscuit the chains must be re-adjusted. This is a time consuming process and one which inevitably leads to certain waste production. Secondly, excessive amounts of air tend to be trapped within the finished packages with the result that subsequent handling and packing of the packages into outer cases or containers for transport is rendered difficult.

With a view to overcoming the problem of excessive air within the packages it has been proposed to apply a vacuum to the tube and, in a known arrangement, the vacuum is applied to the packaging tube adjacent the point where the lateral edges of the web are brought together to form the tube. The vacuum is simply applied by means of a suction chamber under the support surface on which the groups of biscuit move into and through the packaging machine. The conveyor feeds the groups of biscuits to the packaging machine and the end of the conveyor passes through the suction chamber, which is of sufficient size to accommodate the end roller of this conveyor. Whilst this proposal does, to an extent, reduce the amount of air contained in the final packages it does not completely eliminate the air problem. Firstly, because the conveyor passes through the suction chamber it is not possible to seal the suction chamber from the outside environment, so that it is difficult to obtain an effective vacuum without expending significant power. Secondly, it will be appreciated that, since the final sealing and severing station is located two or three package lengths downstream of the point where the vacuum is applied, it is difficult to expel air from the final package which is about to be closed and severed because of the intervening two or three groups of product located between the severing point and the point of application of vacuum. When the sealing and severing of the package end takes place, the air which is left between the groups of biscuits in the packaging web at the point where the package end is to be sealed and severed is forced back towards the groups of biscuits upstream causing puffing of the web. This puffing tends to disturb the biscuits, particularly the leading and trailing biscuits, in the upstream groups, causing them to fall over if external supports, such as side chains, are not provided.

In conventional machines, after the edge zones of the web have been brought together, the flap so formed is gripped between nips of successive pairs of rollers located beneath the support surface or machine bed on which the partly formed packages slide. These rollers drive the partly formed packages towards the sealing and severing station and, by applying pressure and/or heat to the packaging web located between the nips, the required seal between the lateral zones of the web is formed. If the web is to be sealed in a cold seal process, at least two pairs of rollers are preferred. Although only one pair of rollers may be necessary to form the seal, two pairs are preferred to provide sufficient pull to drive the partly formed packages of biscuits towards the sealing and severing station. If a heat seal process is to be used, it is preferred to provide at least two pairs of heated rollers to plasticize and seal the web, in which case at least one further pair of rollers needs to be provided to drive the partly formed packages towards the sealing and severing station.

In our pending European patent application No. 94305754.7 we disclose how an improvement in the air extraction from the final package can be achieved if the edge of at least one roller of at least the first pair of rollers downstream of the point of application of the suction is relieved whereby an air passage is formed within the tube at the point where the tube passes the relevant pair of rollers as it moves downstream in the machine direction. More especially, a substantial improvement in air extraction can be achieved when both of each pair of rollers at each nip, except the final nip, are relieved by a chamfer whereby, as the package passes each of the relieved rollers, a generally triangular zone is formed inside the web between the web lying against the chamfered rollers and the lower face of the product being packaged.

According to the present invention there is provided a packaging machine adapted to form a web of packaging material into a tube to surround items to be packed, the tube then being closed, sealed and severed between successive items to produce individual packages, the tube being formed by sealing one surface of an edge zone of the web to the same surface of the opposite edge zone of the web so that, in the finished package, the sealed zones form a flap extending longitudinally of the package, the machine comprising a support surface having a longitudinal slot therein, said slot being adapted to accommodate said flap, said machine further comprising at least two pairs of rollers, at least the first of said pairs of rollers being located beneath the support surface, said pairs of rollers forming successive nips for gripping said flap and driving the partly formed packages along the support surface towards a closing, sealing and severing station and for forming the required seal between the edge zones of the web, and means for applying a vacuum to the tube adjacent the point where the edge zones of the web are brought together to form the tube, wherein the width of said longitudinal slot for at least a section of the slot downstream of the point of application of the vacuum, is sufficiently great relative to the distance of at least the first pair of rollers below the support surface to allow an air passage to be formed within the tube as it moves towards the closing, sealing and severing station.

In a preferred embodiment of the invention, for the entire length of the slot downstream of the point of application of the vacuum until the nip of the final pair of rollers is reached, the width of the slot is sufficiently great relative to the distance of the rollers below the support surface to allow the air passage to be formed.

In a machine incorporating the present invention substantially all surplus air will be removed from the final package before closing, sealing and severing, with the result that in the individual packages formed by the machine the packaging film closely conforms to the product within it. Because the rollers and the items within the tube hold the packaging film under tension the air passage does not collapse when a vacuum is applied. In addition, when the sealing and severing of the package end takes place, any small amounts of air left in the package are expelled towards the groups of product located between the severing point and the point of application of the vacuum, and the air passage allows this air to be passed back readily to the point of application of the vacuum, avoiding disturbance to the biscuits in the upstream groups. Moreover, this air which is forced back up the tube also assists in preventing the collapse of the air passage.

The improved air extraction of the present invention causes the web, in the zones between the individual groups of product, to be sucked inwardly towards the centre of the tube, notwithstanding that the tube is maintained under tension as it is pulled through the machine line by the rollers. The effect of this partial collapse of the tube and the effective application of the vacuum is to prevent the biscuits forming each group from being displaced from the vertical array in which they are fed to the packaging station. Hence, the side chains often previously required to maintain the biscuits in the desired orientation may be omitted, resulting in a general simplification of the machine and the removal of the undesirable setting step then required each time the product line being handled by the packaging machine is changed.

As the tube of the invention collapses under the influence of the applied vacuum, gussets are automatically formed in the lateral edges of the tube. Heretofore, when packaging products of, for example, rectangular cross-section it has usually been necessary to form gussets by mechanical gusseting fingers immediately prior to operation of the closing, sealing and severing machine. Since, in embodiments of the present invention, gussets are automatically formed by the collapsing tube, there is no requirement for gusseting fingers.

In a particularly preferred embodiment of the invention, the support surface is cut away at the final pair of rollers and the top surface of the final pair of rollers is level with the support surface.

A further improvement in air extraction can be achieved by applying the suction to the tube downstream of the end of the conveyor which feeds the groups of biscuits into the packaging machine, between the end of the conveyor and the first pair of rollers at which the edges of the web are brought together to form the tube. The conventional suction chamber may be replaced with a small housing fitted beneath the support surface on which the groups of biscuits move as disclosed in our pending European application No. 94305754.7.The housing, in combination with the support surface, then substantially surrounds the point where the lateral edges of the web are brought together to form the packaging tube and is sufficiently small that the end roller of the conveyor does not interfere with the housing. The housing may be located beneath guide slots in the support surface which bring the edges of the web together, and may extend above and beneath the first pair of rollers to the point where the nip is formed between the first pair of rollers. The housing preferably seals against the underside of the support surface and closely abuts the top surface and the underside of the first pair of rollers. A source of vacuum is applied to the housing and, because the housing and support surface substantially surround the point where the lateral edges of the web are brought together, there is little leakage from the surroundings into the evacuated housing and the vacuum source need be considerably less powerful than in known machines.

A particularly preferred embodiment of the invention comprises three successive pairs of rollers.

The invention will be better understood from the following description of a preferred embodiment thereof, given by way of example only, reference being had to the accompanying drawings wherein.

Figure 1:
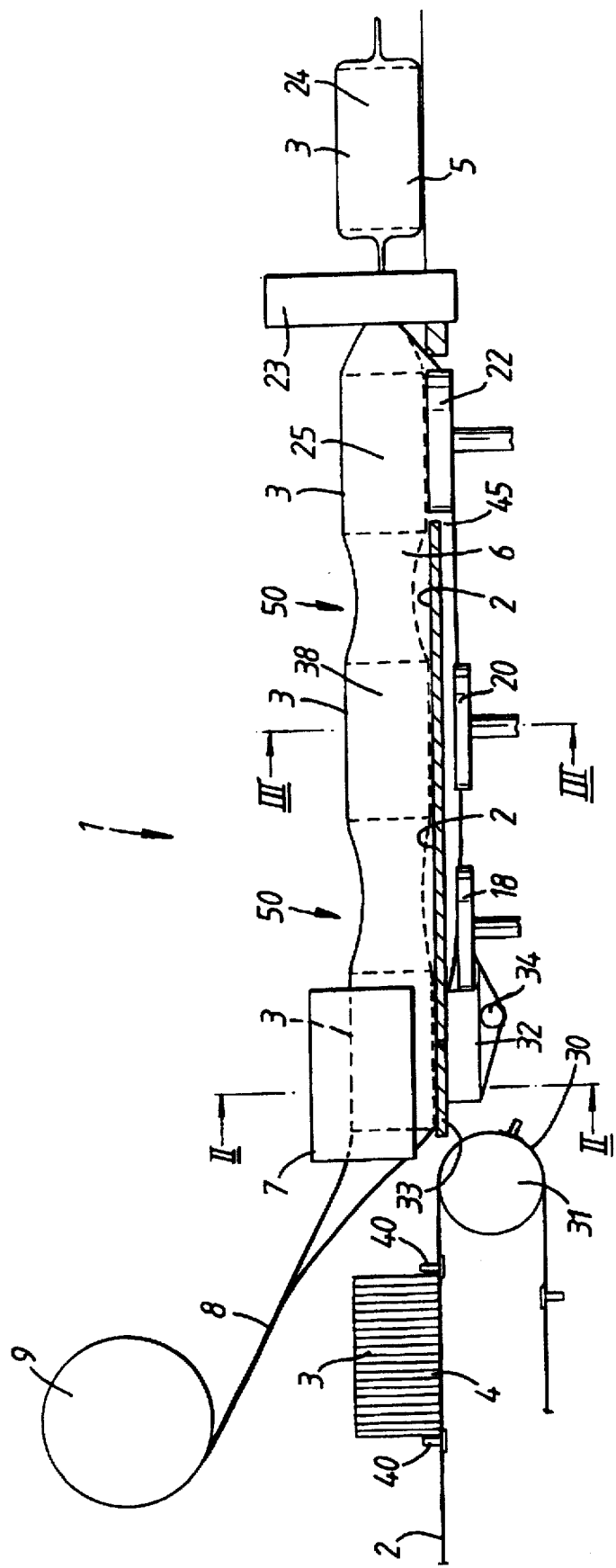
FIG. 1 shows schematically a side view of an embodiment of the invention.

Referring firstly to FIG. 1, a packaging machine 1 comprises a bed or support surface 2 along which groups 3 of a product 4 pass to form discrete packets 5 of the product. Apparatus is provided upstream of the machine 1 for grouping the product 4 into the required groups 3 and for spacing the groups apart for supply to the packaging machine,the groups being conveyed into the packaging machine by conveyor 30 which returns around end conveyor roller 31. The conveyor 30 may be provided with fingers 40 for supporting the groups 3 on the conveyor. Such apparatus will be well known to those skilled in the art and will not be described further here.

Figure 2:
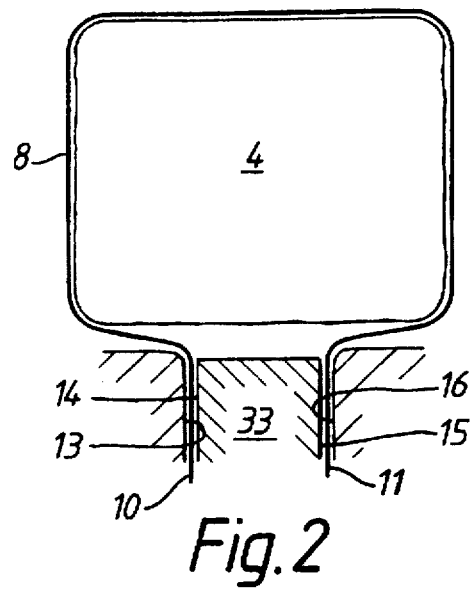
FIGS. 2 and 3 show schematic cross-sections on the lines II—II and III—III respectively of FIG. 1.

As the product passes through the machine a tube 6 is formed about the successive groups 3 in a tube forming station 7. In the tube forming station 7, a web 8 of, e.g., plastics film from a suitable supply reel 9 is guided and shaped into a tube. The tube is formed by bringing one face of one edge zone 10 of the web into engagement with the same face of the opposite edge zone 11 (see FIGS. 2 and 3). For this purpose, the web is initially deformed into a generally inverted U-shape and the edge zones 10,11 are fed between guides 13,14 (for the edge zone 10) and 15,16 (for the edge zone 11). The edge zones then pass into a longitudinal slot 43 in the support surface and also into the nip between a pair of rollers 17,18 (see FIG. 3) and are sealed to form a flap 45. The rollers 17,18 are driven and accordingly grip the flap and thus move the tube forward in the machine direction. In this embodiment two further pairs of rollers are located downstream of the tube forming station of which one of each pair 20, 22 can be seen in FIG. 1. The first two pairs of rollers are positioned below the support surface of the machine bed. The top surface of the final pair of rollers 22 is level with the top of the support surface 2 and forms part of the surface along which the tube moves, the machine bed being cut away to accommodate the rollers.

Located two or three package lengths downstream of the tube forming station is a tube closing, sealing and severing station 23 in which the tube is flattened to close it, sealed and severed through the seal, thereby simultaneously closing the final package 24 and severing it from the tube and forming the leading closed and sealed end of the next package 25.

Figure 4:
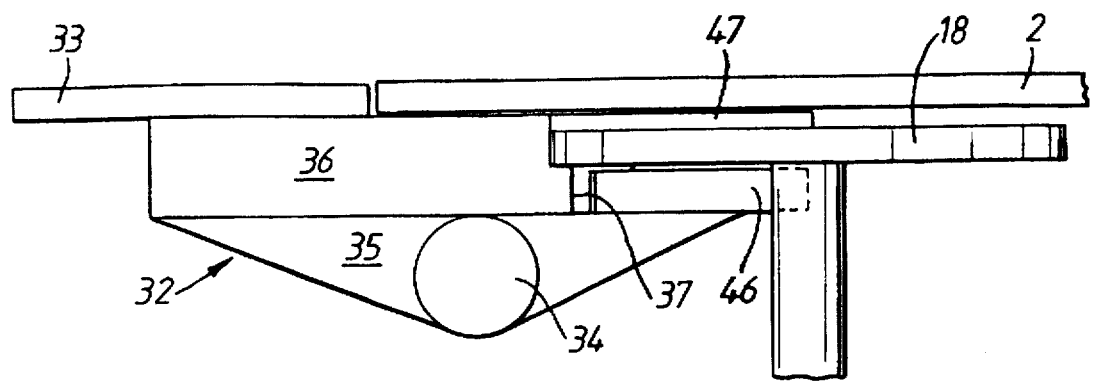
FIG. 4 shows a side view of details of the vacuum housing and first roller.
Figure 5:
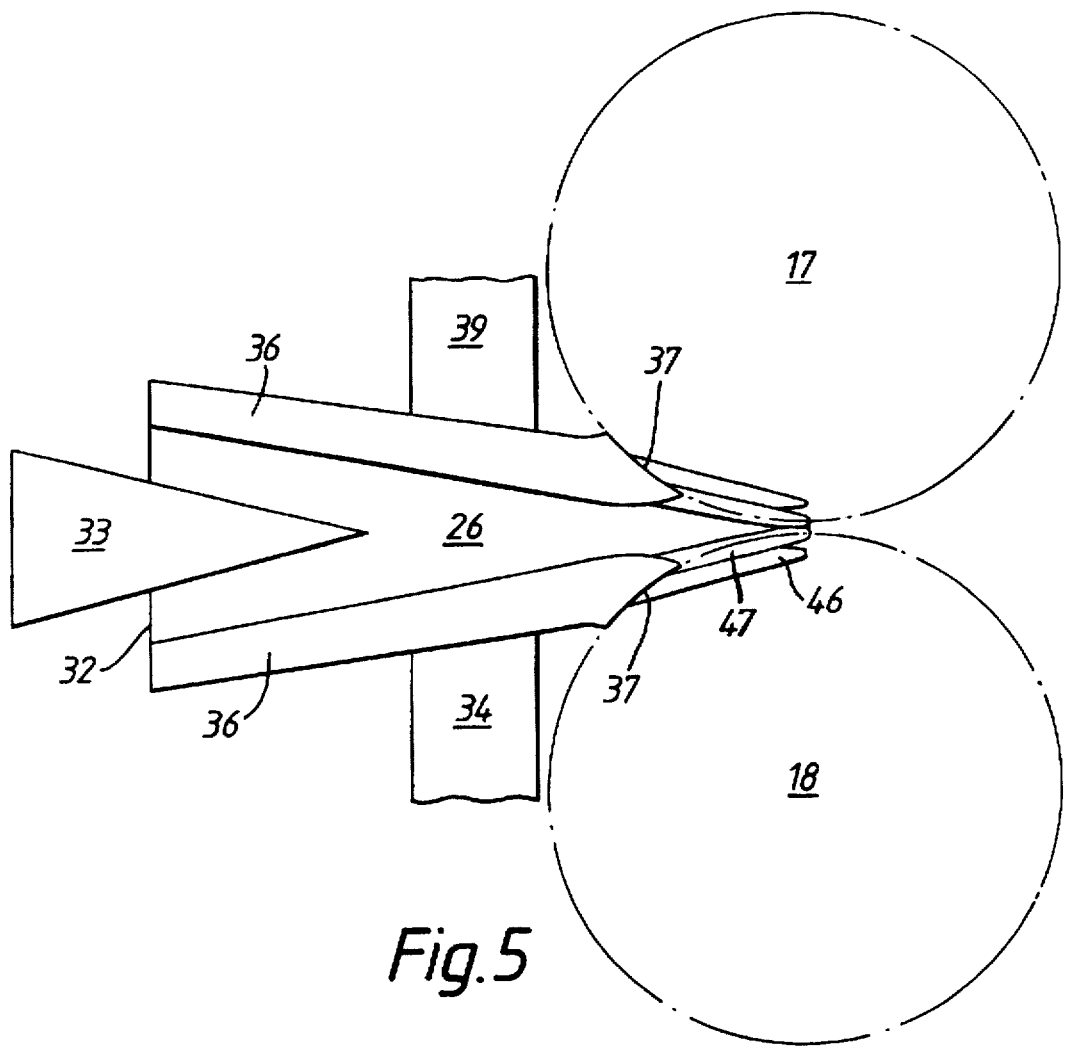
FIG. 5 is a top plan view of the details shown in FIG. 4.

A housing 32 fitted downstream of the conveyor roller 31 and below the plate 33 forming the guides 14 and 15 forms a plenum 26 (see FIG. 5) which is connected to a vacuum source via a tube or duct 34 to establish a subambient pressure at the point of tube formation. It will be appreciated that because of the shape of the web at this point and the relatively fine nature of the web material only a limited vacuum can be drawn from the plenum 26. The housing 32 is fitted beneath the slots in the machine bed which form the guides for bringing the edges 10, 11 of the web together and then feeding the edges to the first rollers 17,18. The sides 35 of the housing 32 have walls 46 which extend below the first pair of rollers 17,18 to the point where the nip is formed between the two rollers 17,18 as well as upper front walls 47 which extend above the first pair of rollers 17, 18 to the point where the nip is formed between them. The sides 35 of the housing (see FIG. 4) are shaped to abut against the underside of the machine bed or support surface 2 and to seal around the two rollers 17,18. Preferably, the sides 35 have top portions 36 formed from a plastics material for providing a more effective seal against the machine bed and around the rollers. Each top portion 36 is provided with an arcuate edge 37 between the upper and lower front walls 46 and 47, the arcuate edge 37 being adapted to cooperate with and abut the circumferential edge of roller 17 or 18, respectively. Thus, the housing 32 cooperates with the rollers and the machine bed substantially to surround the point where the edges 10, 11 of the web are brought together, so that a vacuum may be developed in the plenum 26 by connecting duct 34 to a vacuum source. Because the plenum 26 is sealed from the outside atmosphere save at the points where the web enters and leaves the housing 32, the vacuum can be provided by, for example, a relatively low powered fan operating at around 0.5 KW, or less.

Figure 3:
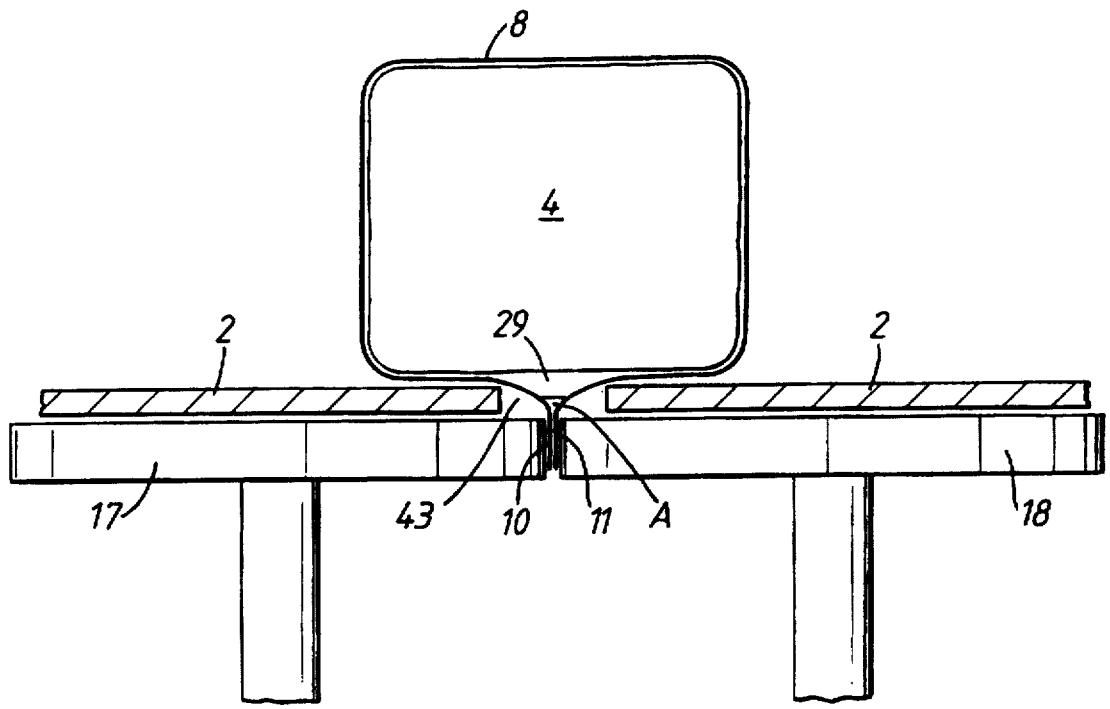

In accordance with the present invention this limited vacuum is utilized in a particularly effective manner to eliminate excess air from the final package 24 so that in the completed and severed package the web material lies closely against the product which has been packed. To this end, the longitudinal slot 43 in the support surface has a width which is sufficiently great when compared to the distance of the rollers 17, 18 below the support surface such that, as more particularly shown in FIG. 3, a generally triangular air passage 29 is formed between the product and the packaging web as the tube advances past the nip formed between rollers 17 and 18 and preferably also between the pair of rollers 20. The longitudinal slot may have this particular width for the length above the rollers 17, 18 and may extend also with that width above the pair of rollers 20, such that the air passage 29 in the tube extends as far as the final pair of rollers 22. The width of the slot may, for example, be in the range of 5 to 40 mm, and is preferably approximately 20 mm, while the distance of the top of the rollers 17, 18 below the top of the support surface 2 may, for example, be in the range of 2 to 15 mm and is preferably no more than 8 mm. The angle A included by the packaging film in slot 43, as shown in FIG. 3, is preferably of the order of 90 degrees or more. However, the dimensions of the slot and of the vacuum passage 29 are dependent on the type and size of the product being packaged. Clearly, larger products will be packaged in larger packages where a greater amount of air will need to be evacuated, so that the cross-sectional dimensions of the vacuum passage 29 may be larger to allow for more rapid or more effective evacuation of the air. In each case, the most appropriate dimensions may be selected by a simple process of trial and error depending on the product and package size, the strength of the vacuum used and the result to be achieved. Clearly, if a vacuum passage with a larger cross-section is required, it is more effective to increase both the width of the slot and the distance of the top of the rollers below the top of the support surface, rather than just increasing one of these two dimensions.

The effect of the air passage 29 is to enhance substantially the effectiveness of the vacuum applied at the plenum 26 to the extent that the web, in the zone 50 between the successive groups 3 of product, tends to partially collapse as generally illustrated in FIG. 1. One effect of this is that the web itself holds the product in the required configuration and the side chains required in the prior art are no longer required. In addition, the final package is substantially devoid of excess air. Also, as the tube progressively collapses towards the closing, sealing and severing station 23, gussets are automatically formed in the side of the tube thereby obviating the previous requirement for gusseting apparatus. In addition, as the tube is closed, sealed and severed between packages 24 and 25, the tube is compressed in the closing, sealing and severing station 23 and a small amount of air is thus forced back into the incoming packages 25, 38 and so on. The air passage 29 allows this air to pass readily through the incoming packages and to be extracted through plenum 26, without disturbing the biscuits in the incoming packages. In fact, this air being forced back through the air passage 29 helps prevent the air passage from collapsing under the application of the vacuum as discussed above.

It will be noted that the top surface of the final pair of rollers 22 is level with the support surface 2. Accordingly, as the web passes through the final nip prior to the closing, sealing and severing station, the seal between the facing zones of the web is completed. It has been found that the lack of an air passage in the tube at the final nip does not, as a practical matter, interfere with the air extraction process. While the invention has been described in the context of a biscuit packaging machine with three pairs of rollers, it would be equally applicable to machines with two pairs of rollers, in which case, the widened slot only extends above the first pair of rollers, or to machines with more than three pairs of rollers, in which case the widened slot extends at least above the first pair of rollers, and preferably above all but the last pair of rollers.

Whilst the invention has been described with particular reference to the packaging of biscuits it will be appreciated that it is of general applicability to many packaging applications in which a product is packaged by first forming a tube about the product and then sealing the tube to form individual packages.

What is claimed is:

1. A packaging machine adapted to form a web of packaging material into a tube to surround items to be packed, the tube then being closed, sealed and severed between successive items to produce individual packages, the tube being formed by sealing one surface of an edge zone of the web to the same surface of the opposite edge zone of the web so that, in the finished package, the sealed zones form a flap extending longitudinally of the package, the machine comprising a support surface having a longitudinal slot therein, said slot being adapted to accommodate said flap, said machine further comprising at least two pairs of rollers, at least the first of said pairs of rollers being located beneath the support surface, said pairs of rollers forming successive nips for gripping said flap and driving the partly formed packages along the support surface towards a closing, sealing and severing station and for forming the required seal between the edge zones of the web, and means for applying vacuum to the tube adjacent the point where the edge zones of the web are brought together to form the tube.

characterized in that at least the first pair of rollers is disposed at a predetermined distance below the level of the support surface, and the width of the longitudinal slot is maintained at a value greater than needed to bring the edge zones of the web together, the longitudinal slot being maintained at this value for the entire length of the slot downstream of the point of application of the vacuum until the nip of the final pair of rollers is reached to allow an air passage to be formed within the tube as it moves towards the closing, sealing and severing station.

2. A machine according to claim 1, wherein the width of the slot is in the range 5 to 40 mm.

3. A machine according to claim 1, wherein the distance of the rollers below the support surface is in the range 2 to 15 mm.

4. A machine according to claim 1, wherein the support surface is cut away at the final pair of rollers and the top surface of the final pair of rollers is level with the support surface.

5. A machine according to claim 1, further comprising a small housing fitted beneath the support surface on which the groups of biscuits move, the housing, in combination with the support surface, being adapted substantially to surround the point where the lateral edges of the web are brought together to form the packaging tube.

6. A machine according to claim 5, wherein the housing is located beneath guide slots in the support surface which bring the edges of the web together, and extends above and beneath the first pair of rollers to the point where the nip is formed between the first pair of rollers.

7. A machine according to claim 6, wherein the housing seals against the underside of the support surface and closely abuts the top surface and the underside of the first pair of rollers.

8. A machine according to claim 1, comprising three successive pair of rollers.

* * * * *